Oct. 6, 1964    H. W. WEGENER    3,151,592
SUMP AND NOZZLE FOR SOLDERING MACHINES
Filed May 20, 1963
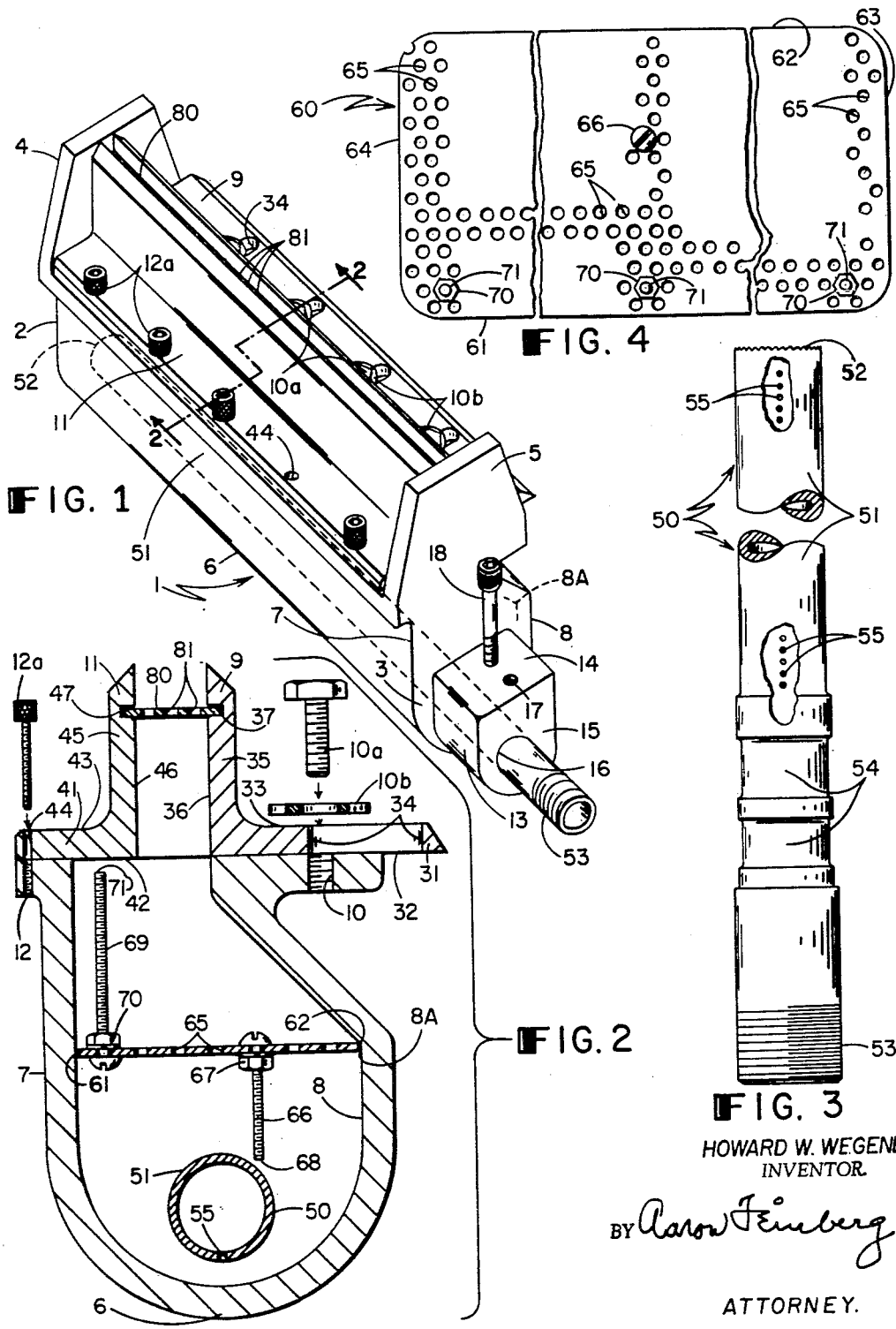
HOWARD W. WEGENER,
INVENTOR.
BY Aaron Feinberg
ATTORNEY.

United States Patent Office 3,151,592
Patented Oct. 6, 1964

3,151,592
SUMP AND NOZZLE FOR SOLDERING MACHINES
Howard W. Wegener, Hollis, N.H. (Wilton, N.H.)
Filed May 20, 1963, Ser. No. 281,500
3 Claims. (Cl. 113—126)

This invention relates to mass soldering machines and more particularly to the sumps and nozzles used in such machines. It is a more detailed disclosure of another embodiment of the nozzle chamber, nozzle and nozzle orifice of a soldering machine using a mixture of solder and oil for soldering printed circuit boards as described in my copending application Serial No. 30,663, now abandoned.

It is the object of my invention to discharge from the nozzle of a fountain mass soldering machine a vertical wave of oil and solder, continuously and forcibly mixed, so that the oil appears as a series of fine droplets of oil evenly dispersed on the crest of the wave.

It is another object to produce a surface tension reducing action at the point of actual soldering action by the use of such a mixture, so positioned.

It is a further object to provide a nozzle chamber and nozzle using a mixture of oil and solder applied so as to prevent excessive solder pick-up.

My invention provides a nozzle chamber or sump combined with a nozzle which receives a mixture of oil and solder, continues the mixing action throughout the passage of the oil and solder through the sump and nozzle and at the same time evens out the flow of the mixture so that the discharge from the orifice of the nozzle is a vertical wave with a smooth horizontal crest containing an even distribution of solder and fine droplets of oil.

For a greater understanding of the present invention together with other and further objects thereof, reference is had to the following specification taken in connection with the accompanying drawings in which:

FIG. 1 is a view in perspective of the assembled sump and nozzle.

FIG. 2 is a section taken on line 2—2 of FIG. 1.

FIG. 3 is a bottom view of the intake pipe.

FIG. 4 is a top view of the mixing sheet.

Referring to the drawings, the combination sump and nozzle therein shown, as illustrative of one embodiment of my invention comprises a horizontal sump body or nozzle chamber 1, with a vertical left end 2, a vertical right end 3, an upper vertical abutment 4 extending above end 2, a similar abutment 5 extending above end 3, a rounded lower portion 6, a vertical front wall 7 extending upwardly from the rounded semicircular bottom 6 on one side, and an angular rear wall 8 extending upwardly from the rounded bottom 6 on the other side, the wall 8 slanting upwardly towards the wall 7 at an angle of approximately 45 degrees starting at the point 8A. On a horizontal lip extending outwardly from the top of the wall 8, provisions are made for positioning a movable nozzle plate 9, using threaded holes 10 in lip to accommodate stud bolts and washers 10a and 10b for this positioning. On a shorter horizontal lip extending outwardly from the top of the wall 7 provisions are made for attaching a fixed nozzle plate 11, using threaded holes 12 in this lip to accommodate stud bolts 12a for this attachment. The entire interior surface of said sump body is tin plated to insure that it will be wet by solder to provide a smooth wave.

Extending from the end 3 of the body 1 is a horizontal boss extension 13, with a top surface 14 and an end surface 15. Through surface 15 and extending into the body of the sump is a cylindrical hole 16, adapted to hold an intake pipe in a horizontal position. Through surface 14 and extending into hole 16 are two or more threaded vertical holes 17 adapted to receive extra long set screws 18, for purposes of positional adjustments of the sump.

When assembled on the top of the sump body, the nozzle has vertical sides and vertical ends and comprises a fixed nozzle plate, a movable nozzle plate and a perforated horizontal nozzle sheet. The movable nozzle plate 9 is angular in cross section with a base leg 31 having a smooth bottom surface 32 and an upper surface 33. In the base leg 31 there are slotted openings 34 adapted to cooperate with threaded holes 10 in the top lip of the sump body to provide means for adjustably attaching nozzle plate 9 thereto. The vertical leg 35 of nozzle plate 9 has a tin plated inner surface and is provided with a horizontal slot 37 to hold one edge of an upper horizontal perforated nozzle sheet 80.

The fixed nozzle plate 11 is angular in cross section with a base leg 41 having a smooth bottom surface 42 and an upper surface 43. In the base leg 41 there are holes 44 adapted to coincide with threaded holes 12 in the top lip of the sump body for attaching plate 11 thereto. The vertical leg 45 of the nozzle plate 11 has a tin plated surface 46 and is provided with a corresponding longitudinal slot 47 to cooperate with slot 47 in the surface 36 to hold the opposite edge of the upper nozzle sheet 80 in a horizontal position. The vertical inner surfaces 36 and 37 of nozzle plates 9 and 11 fit in between the vertical abutments 4 and 5 forming the sides and ends of a rectangular nozzle orifice.

Adapted to be positioned with a light press fit into hole 16 and extending into the interior of the body is a cylindrical intake pipe 50 spaced from the rounded bottom 6 and extending through the length of the body. The pipe 50 has an outer surface 51, a closed end 52 to be positioned adjacent to end 2 of the body, and a threaded end 53 of sufficient length to extend externally from the end surface 15 of the boss 13. Adjacent to the threaded end 53 are longitudinal indents 54 adapted to be positioned within the boss to cooperate with the set screws 18, providing means for holding the longitudinal position of said sump and nozzle on the intake pipe and means for adjusting and holding the angular position of said sump and nozzle relative to said pipe. Drilled in a continuous straight line in the bottom of surface 51 and extending from indents 54 to the closed end 52 are a series of evenly spaced outlet holes 55, which are .063 inch±.003 of an inch in diameter, said holes being positioned adjacent to the midpoint of the semicircular bottom 6 of the body. The threaded end 53 is adapted to be connected directly to the output of an adjacent pump, not shown, which supplies a mixture of solder and oil.

Adapted to be positioned horizontally within the body of the sump and above the horizontal pipe 50 is a floating perforated mixing sheet 60 having a front edge 61, a back edge 62, a right end 63, a left end 64 and holes 65. The holes 65 are approximately ⅛ inch in diameter on 3/16 inch centers, and are uniformly and symmetrically positioned in sheet 60. A depending support 66 is attached perpendicularly to said sheet 60 by nut 67. The support 66 has a bottom end 68. Upwardly extending levelling posts 69 are attached perpendicularly to sheet 60 by nuts 70. The posts 69 have top ends 71. The mixing sheet 60 extends from end 2 to end 3 and between the walls 7 and 8 of the interior of the body and is adapted to float in substantially a horizontal position, spaced from the top of the body by means of the levelling posts 69 when the machine is in operation and to rest substantially in a horizontal position by means of the support 66 when the machine is at rest.

Adapted to be fitted into the slot 37 in the surface 36 of the movable nozzle plate 9 and into the slot 47 in the surface 46 of the fixed nozzle plate 11 is an upper horizontal perforated nozzle sheet 80, extending between the inside surfaces of abutments 4 and 5. The sheet 80 has at least three longitudinal rows of holes 81 exposed between surfaces 36 and 46, uniformly and symmetrically positioned, the center lines of said rows of holes being parallel to the inner surfaces 36 and 37 of said nozzle plates 9 and 11 and parallel to each other. The slots 37 and 47 and the sheet 80 when in place, are positioned adjacent to the nozzle orifice.

In assembly, the intake pipe 50 is inserted into hole 16 in the boss 13 of the body 1 and positioned so that the holes 55 in the pipe are pointed downward and opposite the center line of the rounded bottom 6 and the indents 54 are positioned within the boss and under the bottoms of the long set screws 18. The set screws 18 are long so that they extend upwardly into the solder in the solder reservoir, not shown, and are more readily accessible for purposes of adjusting the longitudinal and angular position of the sump.

Depending support 66 is attached to sheet 60 by means of nut 67 while the upwardly extending levelling posts 69 are attached to the sheet 60 by the nuts 70. The assembled perforated mixing sheet 60 is then inserted into the body of the sump with support 66 in a depending position and towards the rear wall 8 of the body and with the levelling posts 69 extending upwardly and adjacent to the front wall 7.

The fixed nozzle plate 11 is then fitted between the vertical abutments 4 and 5 and attached to the horizontal lip on top of the wall 7 by means of the bolts through holes 44 and threaded holes 12. In slot 47, in the inner surface 46 of the vertical leg 45 of plate 11, is inserted the front edge of the perforated nozzle sheet 80.

The movable nozzle plate 9 is then fitted between the vertical abutments 4 and 5. The rear edge of nozzle sheet 8 is inserted into slot 37 in the inner surface 36 in the vertical leg 35 of plate 9.

The plate 9 is then attached to the horizontal lip on the top of wall 8 by means of bolts through slotted holes 34 and threaded holes 10.

A nipple connects the threaded end 53 of the sump intake pipe directly to the output pipe of a mixing pump positioned as close to the sump as practicable in order to reduce the opportunity for the mixture of solder and oil to separate back into its component parts due to the great difference in specific gravity between the two.

At times it may be necessary to change the angular position of the sump relative to the pipe or to move it longitudinally a small amount within the limits of the length of the indents 54. These adjustments are accomplished by means of the set screws 18.

In operation, a mixture of solder and oil is forced by the adjacent pump into the intake pipe positioned in the rounded bottom of the sump which allows for the provision of a large volume of solder, the dead weight of which serves to equalize the pressure. The holes in the pipe point downwards so that the mixture flows down through the holes and then up in equal volumes on either side of the pipe thus turning through substantially 180 degrees in direction, which abrupt turn continues the mixing action. The size of the holes are designed to provide adequate back pressure on the pump from the blocked end of the intake pipe to equalize the level of the wave throughout its length.

The upward flow of the mixture then contacts the floating perforated mixing sheet which serves the double purpose of continuing the mixing by breaking up any globules of oil which might have formed and smoothing out the wave. This sheet being of lower specific gravity than the solder tends to float within limits in the upper portion of the sump body above the pipe and in substantially a horizontal position when the pump is running. The possible upper limit of floating is reached when the back edge of the sheet 60 reaches the point 8A on the angular side 8 and when the ends 71 of the levelling posts 69 contact the bottom surface 42 of the fixed plate 11. The end 68 of the depending support 66 keeps the sheet in an approximately horizontal position when the machine is not operating and also prevents it from rotating about the pipe in a clockwise direction.

While the preferred embodiment of my invention has been described in detail, it will be understood that I do not wish to be limited to the particular construction set forth, since various changes in the form, materials, proportions and arrangement of parts and in the detail of construction may be resorted to without departing from the spirit and scope of the invention, or destroying any of the advantages contained in the same, heretofore described and defined in the following claims.

I claim:

1. In a mass fountain soldering machine using a mixture of solder and oil, a combination sump and nozzle comprising (I) a horizontal sump body with a rounded lower portion,
  (A) said rounded portion being semicircular, said body comprising vertical ends, a vertical front wall, an angular rear wall, an upper vertical abutment at each end and a boss extension at one end, said boss having a horizontal cylindrical hole adapted to receive an intake pipe, (II) a horizontal intake pipe positioned in said rounded lower portion and having a longitudinal continuous straight line of evenly spaced outlet holes, the bottom of said pipe being adapted to be positioned with said holes adjacent to said rounded bottom,
  (A) said pipe extending the length of said body and spaced from the bottom of said body, (III) a perforated horizontal mixing sheet positioned within said body and above said pipe, said sheet being provided with means to maintain it in a substantially horizontal position spaced from the top of said body when the machine is in operation and to position said sheet in substantially a horizontal position when machine is at rest,
  (A) said sheet positioning means comprising a depending perpendicular support and upwardly extending perpendicular levelling posts, (IV) a horizontal nozzle with vertical sides and vertical ends and positioned on top of said body,
  (A) said nozzle comprising a fixed angular nozzle plate, a movable angular nozzle plate and a perforated horizontal nozzle sheet, said plates extending between said abutments, (V) said upper horizontal perforated nozzle sheet extending from side to side and between the ends of said nozzle and adjacent to the orifice of said nozzle,
  (A) said sheet having at least three rows of holes uniformly and symmetrically positioned between the vertical sides of said nozzle plates, the center lines of said rows of holes being parallel to the sides of said plates and parallel to each other.

2. In a mass fountain soldering machine using a mixture of solder and oil, a combination sump and nozzle comprising (I) a horizontal sump body with a rounded lower portion,
  (A) said rounded portion being semicircular, said body comprising vertical ends, a vertical front wall, an angular rear wall, an upper vertical abutment at each end and a boss extension at one end, said boss having a horizontal cylindrical hole adapted to receive an intake pipe,
  (B) said body provided with means for adjusting the longitudinal position of said sump and nozzle on said pipe, and means for adjusting the angular position of said sump and nozzle relative to said pipe, (II) a horizontal intake pipe positioned in said rounded lower portion and having a longitudinal continuous straight line of evenly spaced outlet holes, the bottom of said pipe being adapted to be positioned with said holes adjacent to said rounded bottom,
- (A) said pipe extending the length of said body and spaced from the bottom of said body,
- (B) said pipe being closed on one end and threaded on the other end, and extending externally from the end of said boss, said pipe having longitudinal indents adjacent to said threaded end and adapted to cooperate with said positioning means in said body, (III) a perforated horizontal mixing sheet positioned within said body and above said pipe, said sheet being provided with means to maintain it in a substantially horizontal position spaced from the top of said body when the machine is in operation and to position said sheet in substantially a horizontal position when machine is at rest,
- (A) said sheet positioning means comprising a depending perpendicular support and upwardly extending perpendicular levelling posts,
- (B) said sheet extending from end to end between the interior walls of said body, (IV) a horizontal nozzle with vertical sides and vertical ends and positioned on top of said body,
- (A) said nozzle comprising a fixed angular nozzle plate, a movable angular nozzle plate and a perforated horizontal nozzle sheet, said plates extending between said abutments,
- (B) said fixed plate having a smooth flat bottom, a smooth vertical side perpendicular to said bottom and a longitudinal horizontal slot in said vertical side adapted to hold one edge of said nozzle sheet and means for fixedly attaching the bottom of said fixed plate to the top of said body, said movable plate having a smooth flat bottom, a vertical side perpendicular to said bottom and a longitudinal horizontal slot in said vertical side adapted to hold the other edge of said nozzle sheet and means for adjustably attaching the bottom of said movable plate to the top of said body, (V) said upper horizontal perforated nozzle sheet extending from side to side and between the ends of said nozzle and adjacent to the orifice of said nozzle,
- (A) said sheet having at least three rows of holes uniformly and symmetrically positioned between the vertical sides of said nozzle plates, the center lines of said rows of holes being parallel to the sides of said plates and parallel to each other.

3. In a mass fountain soldering machine using a mixture of solder and oil, a combination sump and nozzle comprising (I) a horizontal sump body with a rounded lower portion,
- (A) said rounded portion being semicircular, said body comprising vertical ends, a vertical front wall, an angular rear wall, an upper vertical abutment at each end and a boss extension at one end, said boss having a horizontal cylindrical hole adapted to receive an intake pipe,
- (B) said body provided with means for adjusting the longitudinal position of said sump and nozzle on said pipe, and means for adjusting the angular position of said sump and nozzle relative to said pipe,
- (C) the interior surface of said body being tin plated, (II) a horizontal intake pipe positioned in said rounded lower portion and having a longitudinal continuous straight line of evenly spaced outlet holes, the bottom of said pipe being adapted to be positioned with said holes adjacent to said rounded bottom,
- (A) said pipe extending the length of said body spaced from the bottom of said body,
- (B) said pipe being closed on one end and threaded on the other end, and extending externally from the end of said boss, said pipe having longitudinal indents adjacent to said threaded end and adapted to cooperate with said positioning means in said body,
- (C) said exterior threaded end being adapted to be connected directly to the output orifice of a pump supplying a mixture of solder and oil, the diameter of said outlet holes having a diameter range from .060 inch to .066 inch, (III) a perforated horizontal mixing sheet positioned within said body and above said pipe, said sheet being provided with means to maintain it in a substantially horizontal position spaced from the top of said body when the machine is in operation and to position said sheet in substantially a horizontal position when machine is at rest,
- (A) said sheet positioning means comprising a depending perpendicular support and upwardly extending perpendicular levelling posts,
- (B) said sheet extending from end to end between the interior walls of said body,
- (C) said sheet having holes of ⅛ inch in diameter uniformly and symmetrically positioned on 3/16 inch centers, (IV) a horizontal nozzle with vertical sides and vertical ends and positioned on top of said body,
- (A) said nozzle comprising a fixed angular nozzle plate, a movable angular nozzle plate and a perforated horizontal nozzle sheet, said plates extending between said abutments,
- (B) said fixed plate having a smooth flat bottom, a smooth vertical side perpendicular to said bottom and a longitudinal horizontal slot in said vertical side adapted to hold one edge of said nozzle sheet and means for fixedly attaching the bottom of said fixed plate to the top of said body, said movable plate having a smooth flat bottom, a vertical side perpendicular to said bottom and a longitudinal horizontal slot in said vertical side adapted to hold the other edge of said nozzle sheet and means for adjustably attaching the bottom of said movable plate to the top of said body, (V) said upper horizontal perforated nozzle sheet extending from side to side and between the ends of said nozzle and adjacent to the orifice of said nozzle,
- (A) said sheet having at least three rows of holes uniformly and symmetrically positioned between the vertical sides of said nozzle plates, the center lines of said rows of holes being parallel to the sides of said plates and parallel to each other.

References Cited in the file of this patent

UNITED STATES PATENTS

| | | |
|---|---|---|
| 2,477,204 | Ravine | July 26, 1949 |
| 3,056,370 | Barnes et al. | Oct. 2, 1962 |
| 3,058,441 | Walker et al. | Oct. 16, 1962 |
| 3,119,363 | Rieben | Jan. 28, 1964 |

FOREIGN PATENTS

| | | |
|---|---|---|
| 862,722 | Great Britain | Mar. 15, 1961 |